United States Patent
Howard et al.

(10) Patent No.: US 11,731,703 B2
(45) Date of Patent: Aug. 22, 2023

(54) ENERGY DISSIPATION SYSTEM FOR VEHICLE CRASH IMPACTS

(71) Applicant: GM GLOBAL TECHNOLOGY OPERATIONS LLC, Detroit, MI (US)

(72) Inventors: John E. Howard, Fenton, MI (US); Bradley Leier, Troy, MI (US); Zohir Molhem, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 196 days.

(21) Appl. No.: 17/236,914

(22) Filed: Apr. 21, 2021

(65) Prior Publication Data

US 2022/0340204 A1 Oct. 27, 2022

(51) Int. Cl.
*B62D 21/15* (2006.01)
*B60R 19/18* (2006.01)

(52) U.S. Cl.
CPC ............ *B62D 21/152* (2013.01); *B60R 19/18* (2013.01)

(58) Field of Classification Search
CPC .............................. B62D 21/152; B60R 19/18
USPC .................................................... 296/187.03
See application file for complete search history.

(56) References Cited

U.S. PATENT DOCUMENTS

| | | | |
|---|---|---|---|
| 6,793,274 B2* | 9/2004 | Riley | B62D 21/152 296/187.03 |
| 9,868,468 B1* | 1/2018 | Park | B62D 25/085 296/187.03 |

* cited by examiner

*Primary Examiner* — Joseph D. Pape
*Assistant Examiner* — Dana D Ivey

(57) ABSTRACT

An energy dissipation system for a frame of a vehicle includes a frame rail including a crushable region and a non-crushable region. An energy dissipation device includes an energy transfer portion arranged partially in the crushable region and partially in the non-crushable region and configured to move in response to a vehicle impact on the frame rail. An energy dissipation portion is arranged within the non-crushable region, connected to the energy transfer portion. The energy dissipation device includes a first region connecting the energy dissipation portion to the non-crushable region, and a second region connecting the energy dissipation portion to the energy transfer portion. The first region of the energy dissipation portion is stiffer than the second region of the energy dissipation portion.

17 Claims, 6 Drawing Sheets

ENERGY DISSIPATION SYSTEM FOR VEHICLE CRASH IMPACTS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to an energy dissipation system including an energy dissipation device connected to a vehicle frame member to help to absorb energy of a crash impact.

Vehicles include a frame and/or other structures that protect occupants of the vehicle during a crash. As a crash impact occurs, portions of the frame and/or other structures are designed to crush and absorb some of the energy of the crash impact.

SUMMARY

An energy dissipation system for a frame of a vehicle includes a frame rail including a crushable region and a non-crushable region. An energy dissipation device includes an energy transfer portion arranged partially in the crushable region and partially in the non-crushable region and configured to move in response to a vehicle impact on the frame rail. An energy dissipation portion is arranged within the non-crushable region, connected to the energy transfer portion. The energy dissipation device includes a first region connecting the energy dissipation portion to the non-crushable region, and a second region connecting the energy dissipation portion to the energy transfer portion. The first region of the energy dissipation portion is stiffer than the second region of the energy dissipation portion.

In other features, the energy transfer portion includes a rod. The energy transfer portion further includes a plunger connected to one end of the rod. The energy transfer portion further includes N pins extending from the plunger in a direction transverse to a length of the rod, where N is an integer greater than 2. The energy dissipation portion includes N cylindrical portions, N sidewalls extending between radial edges of the N cylindrical portions, and N holes in the N sidewalls to receive the N pins, respectively. A first set of 2N fins extend outwardly from the N sidewalls, respectively, on opposite sides of the N holes. A second set of 2N fins extending inwardly from the N sidewalls, respectively, on opposite sides of the N holes.

In other features, the frame rail includes a first bulkhead, a second bulkhead and a third bulkhead, the rod extends through the first bulkhead, and the rod extends through the second bulkhead. The plunger is located between the second bulkhead and the third bulkhead.

In other features, the energy dissipation portion is arranged between the second bulkhead and the third bulkhead.

An energy dissipation device includes an energy transfer portion configured to be arranged partially in a crushable region of a vehicle frame member and partially in a non-crushable region of the vehicle frame member and to move in response to a vehicle impact. An energy dissipation portion is configured to be arranged within the non-crushable region, connected to the energy transfer portion and includes a first region configured to connect the energy dissipation portion to the non-crushable region and a second region connecting the energy dissipation portion to the energy transfer portion. The first region of the energy dissipation portion is stiffer than the second region of the energy dissipation portion.

The energy transfer portion includes a rod, a plunger connected to one end of the rod and N pins extending from the plunger, where N is an integer greater than 2. The energy dissipation portion includes N cylindrical portions; N sidewalls extending between radial edges of the N cylindrical portions; and N holes in the N sidewalls to receive the N pins, respectively.

In other features, a first set of 2N fins extending outwardly from the N sidewalls, respectively, on opposite sides of the N holes. A second set of 2N fins extending inwardly from the N sidewalls, respectively, on adjacent sides of the N holes.

An energy dissipation device includes an energy transfer portion configured for arrangement partially in a crushable region of a vehicle frame member and partially in a non-crushable region of a vehicle frame member and including a rod, a plunger connected to one end of the rod, a mount configured to attach the rod to the crushable regions of the vehicle frame member, and N pins extending from the plunger in a direction transverse to the rod, where N is an integer greater than 2. An energy dissipation portion configured to be arranged within the non-crushable region, connected to the energy transfer portion. The energy dissipation portion includes N cylindrical portions, N sidewalls extending between radial edges of the N cylindrical portions, and N holes in the N sidewalls to receive the N pins, respectively, of the energy transfer portion.

In other features, a first set of 2N fins extending outwardly from the N sidewalls, respectively, on adjacent sides of the N holes and a second set of 2N fins extending inwardly from the N sidewalls, respectively, on adjacent sides of the N holes.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An energy dissipation system according to the present disclosure includes an energy dissipation device mounted to the interior of a vehicle frame member to provide improved energy absorption during a crash impact. In some examples, a portion of the energy dissipation device is positioned in a non-crushable region (such as front or rear rails) of a vehicle frame. Another portion of the energy dissipation device is positioned in both a crushable region (adjacent to the non-crushable frame region) and the non-crushable region. The energy dissipation device reinforces the non-crushable region to improve stiffness while also absorbing energy by deforming and rupturing in specific areas during a crash impact. The energy dissipation device can also increase rail capacity to accommodate a wider mass bandwidth in a vehicle architecture.

Unlike prior structures, the energy dissipation device according to the present disclosure allows energy absorption to be performed in a non-crushable region of a vehicle frame member. Non-limiting examples of non-crushable regions include stanchions, cradles, motor mount joints, etc. The energy dissipation device provides three forms of energy absorption including fracture, deformation and friction. The energy dissipation device includes an energy transfer portion and an energy dissipation portion. The energy dissipation portion is confined and fixed to the non-crushable region and dissipates energy of the crash impact.

Figure 1:
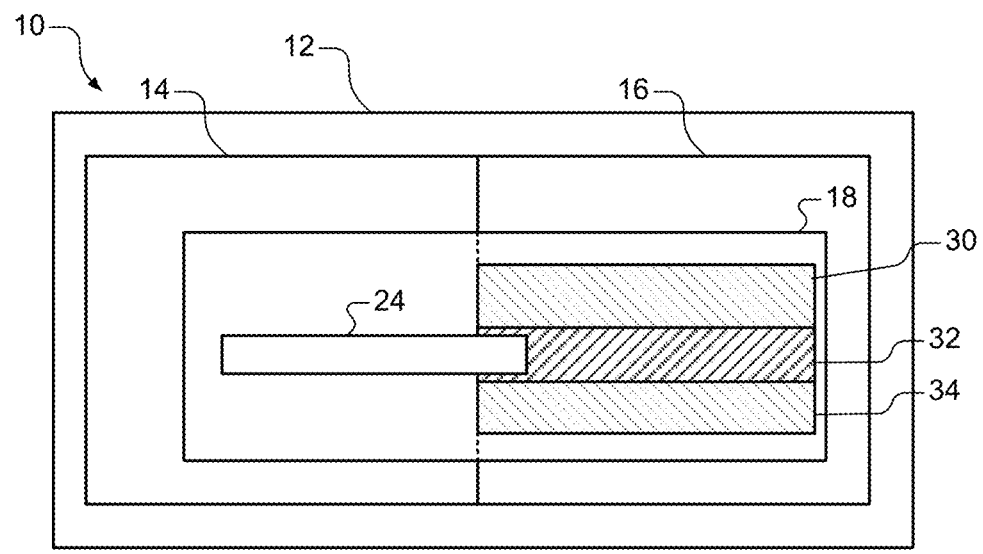
FIG. 1 is a functional diagram of an example of an energy dissipation system including a vehicle frame member and an energy dissipation device according to the present disclosure.

Referring now to FIG. 1, a vehicle 10 includes a vehicle frame member 12 including a crushable region 14 and a non-crushable region 16. The crushable region 14 is crushed during a crash impact to absorb energy of the crash impact while the non-crushable region 16 remains relatively intact during a crash impact and is not crushed. An energy dissipation device 18 includes an energy transfer portion 24 and an energy dissipation portion 30. The energy dissipation portion 30 is arranged in the non-crushable region 16. The energy transfer portion 24 is initially located mostly in the crushable region 14 and moves into the non-crushable region 16 during a crash impact.

The energy dissipation portion 30 includes a first region 34 that is connected to the non-crushable region 16 and a second region 32 that is connected to both the first region 34 and the energy transfer portion 24. The second region 32 is softer than the first region 34. When a crash impact occurs, the energy transfer portion 24 is biased by the crash impact into the second region 32 of the energy dissipation portion 30, which absorbs energy from the crash impact through fracture, deformation and friction.

Figure 2:
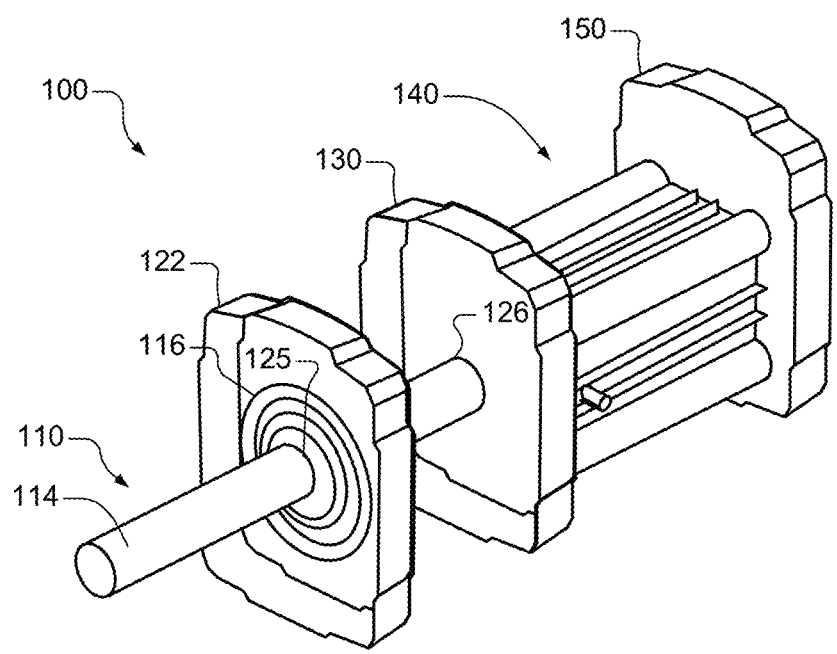
FIG. 2 is a perspective view of the example of the energy dissipation device including an energy transfer portion and an energy dissipation portion according to the present disclosure.

Referring now to FIG. 2, an energy dissipation device 100 according to the present disclosure is shown. The energy dissipation device 100 allows energy absorption in the non-crushable region of a frame member (see e.g. a frame rail FIGS. 5 and 6). In some examples, the frame member includes a plurality of bulkheads (e.g. bulkheads 122, 130 and 150 are shown in FIG. 2). The energy dissipation device 100 provides three forms of energy absorption: fracture, deformation and friction.

The energy dissipation device 100 includes an energy transfer portion 110 and an energy dissipation portion 140. The energy transfer portion 110 includes a rod 114, a mount 116 receiving a mid-portion of the rod 114, and plunger 305 (see FIG. 4) connected to one end of the rod 114. In some examples, the mount 116 includes a circular plate with a center hole for receiving the rod 114. The bulkheads 122, 130 and 150 include holes (e.g. hole 126 shown) to receive the rod 114. Likewise, the mount 116 also includes a hole 125 to receive the rod 114. The mount 116 is attached to the bulkhead 122. In some examples, the rod 114 is slidably received through the hole 125 in the mount 116 and the holes 126 in the bulkheads 122, 130 and 150. Pins 310 (see FIG. 4) project radially outwardly from the plunger 305 relative to a lengthwise or axial direction of the rod 114.

The energy transfer portion 110 is connected to a crushable region of a frame member such as a frame rail. As described above, the energy dissipation portion 140 includes a stiffer region that is connected to a non-crushable region of the frame member and a softer region that is connected to the energy transfer portion 110. The pins 310 are received by the softer region of the energy dissipation portion 140.

As the rail is crushed, the rod 114 of the energy transfer portion 110 stays straight and moves rearward. The plunger 305 and the pins 310 of the energy transfer portion 110 are biased against the softer region of the energy dissipation portion 140, which causes energy dissipation through fracture, deformation and friction. The energy dissipation portion 140 is confined by and fixed to the non-crushable region of the frame member. As a result, the energy dissipation portion 140 allows energy to be dissipated in a portion of the frame member (e.g. the non-crushable region of the frame rail) that usually does not dissipate energy.

Figure 3:
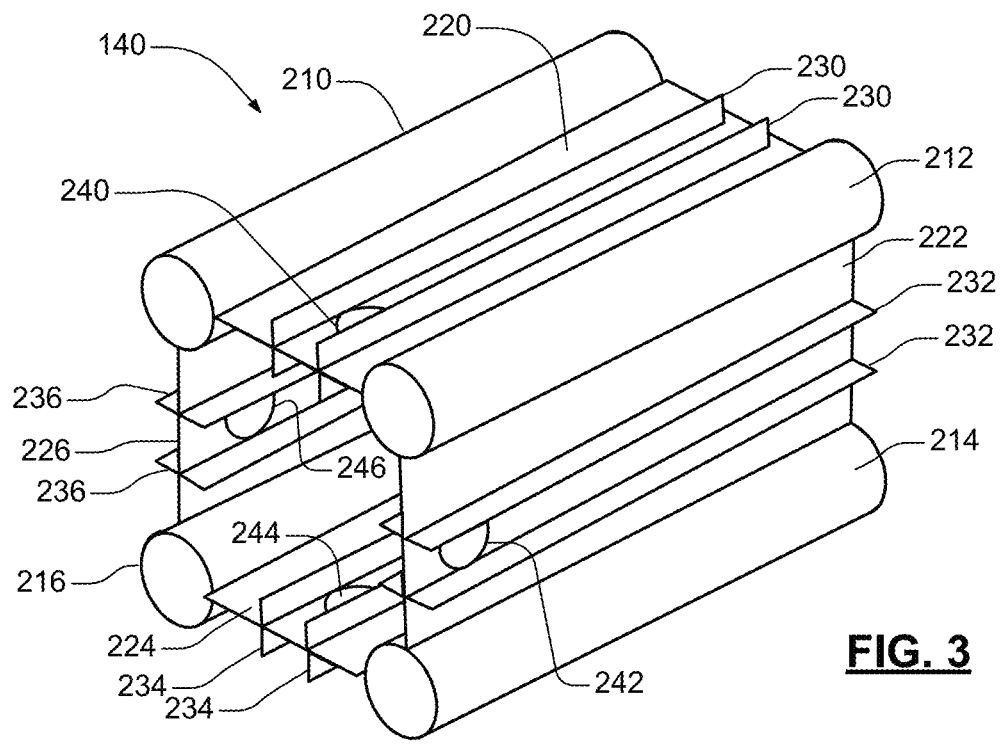
FIG. 3 is a perspective view of an example of the energy dissipation portion according to the present disclosure.

Referring now to FIG. 3, an example of the energy dissipation portion 140 is shown. The energy dissipation portion 140 includes different regions that perform different functions. A first region secures the block to the non-crushable region of the rail. A second region absorbs energy largely through deformation. A third region absorbs energy largely through friction. A fourth region absorbs energy through fracture or fracture propagation. Examples of these regions are described below.

In some examples, the energy dissipation portion 140 includes N sides, where N is an integer greater than 2. In FIG. 2, the energy dissipation portion 140 includes a generally rectangular cross section (e.g. N=4), although other cross-sections such as circular, elliptical, polygonal, regular or irregular cross-sections may be used. The energy dissipation portion 140 includes N cylindrical portions 210, 212, 214, and 216 that extend lengthwise and that are located in corners thereof. The N cylindrical portions 210, 212, 214, and 216 secure the energy dissipation portion 140 to the non-crushable region of the frame rail.

N side walls 220, 222, 224 and 226 extend between radial side surfaces of the N cylindrical portions 210 and 212, 212 and 214, 214 and 216 and 216 and 210, respectively. One or more fins 230, 232, 234 and 236 extend outwardly and/or inwardly and longitudinally along the N side walls 220, 222, 224 and 226 in the same direction as the cylindrical portions. While 2N fins 230, 232, 234 and 236 are shown extending both inwardly and outwardly, other arrangements and/or variations may be used. N holes 240, 242, 244 and 246 in the N side walls 220, 222, 224 and 226 are located between the fins on the side walls and are configured to receive the pins 310 of the energy transfer portion 110.

The fins 230, 232, 234 and 236 and portions of the N side walls 220, 222, 224 and 226 located outside of the fins 230, 232, 234 and 236 absorb energy largely through deformation. The fins 230, 232, 234 and 236 also absorb energy through friction. Portions of the N side walls 220, 222, 224 and 226 located between the fins 230, 232, 234 and 236 absorb energy through fracture or fracture propagation.

Figure 4:
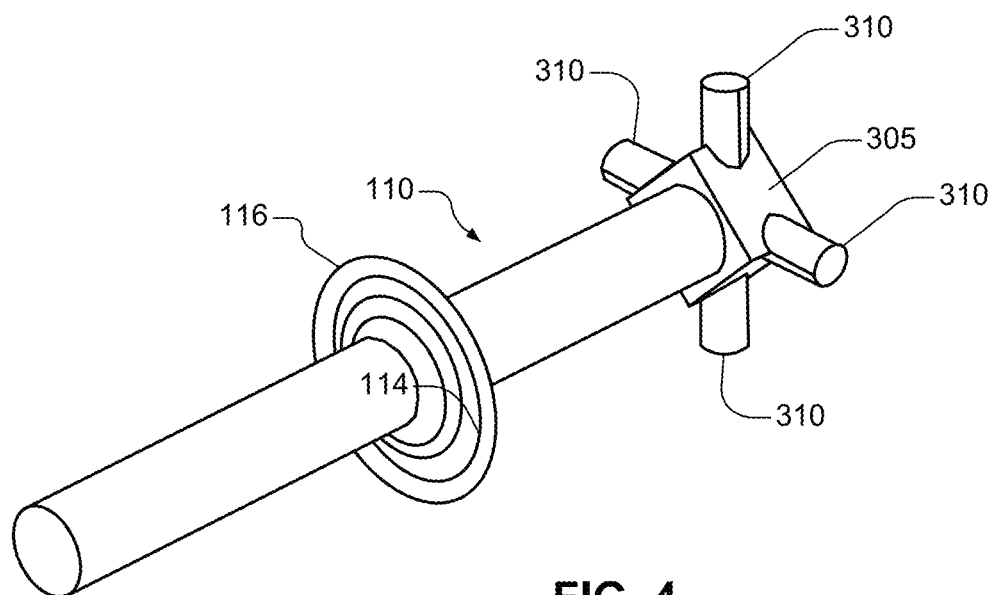
FIG. 4 is a perspective view of an example of the energy transfer portion according to the present disclosure.

Referring now to FIG. 4, the energy transfer portion 110 is shown in further detail. The rod 114 extends through the mount 116 and is connected to the plunger 305. The pins 310 extend radially outwardly from the plunger 305. In some examples, N pins are used. While N=4 pins are shown extending radially outwardly at 90° (or 360°/N) intervals, other angles and/or additional or fewer pins can be used.

In some examples, the energy transfer portion 110 is made significantly stronger than the energy dissipation portion 140 and is designed to engage soon after the point of impact on the rail. As a result, the energy transfer portion 110 transfers energy through the rod 114.

In some examples, the energy transfer portion 110 is made significantly stronger than the energy dissipation portion 140. The energy transfer portion 110 engages soon after impact on the rail occurs and transfers the energy through the rod 114. The mount 116 stabilizes the rod 114 and secures the rod 114 to the frame member. The crash impact pushes the plunger 305 and the pins 310 of the energy transfer portion 110 through the energy dissipation portion 140. In non-impact situations, the plunger 305 and the pins 310 secure the energy transfer portion 110 to the energy dissipation portion 140.

Figure 5:
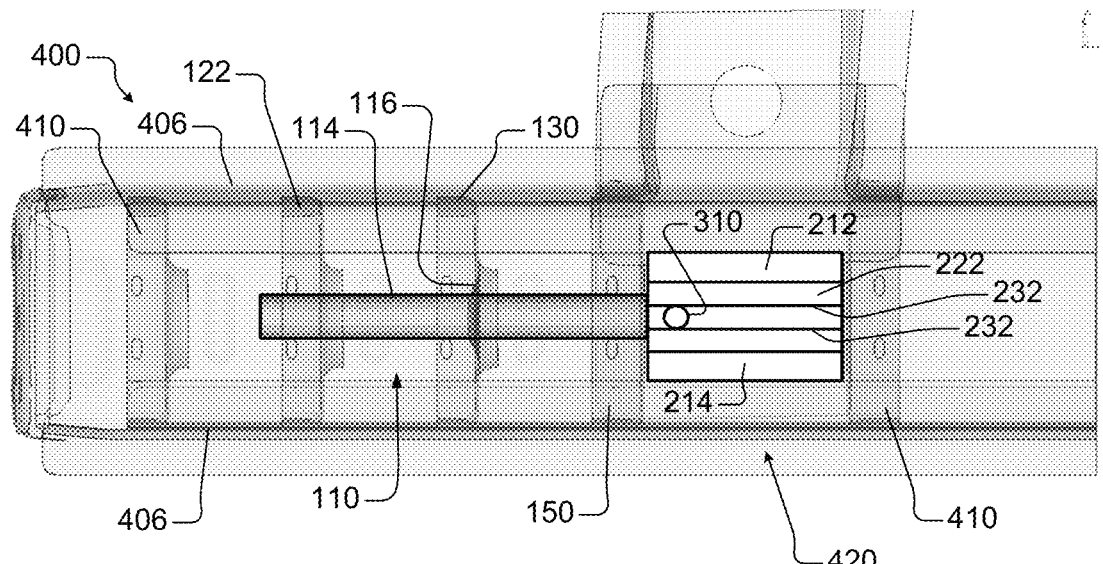
FIG. 5 is a side cross-sectional view of an example of a frame rail and the energy dissipation device before a crash impact according to the present disclosure.
Figure 6:
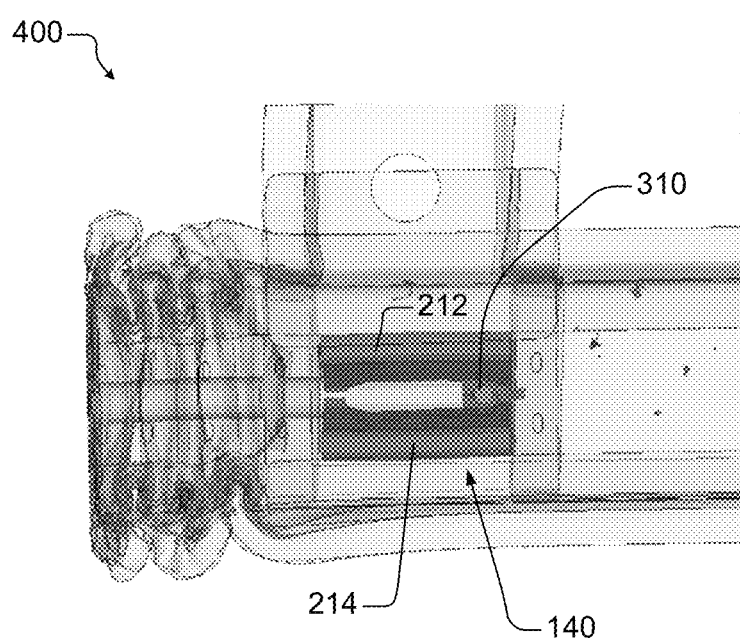
FIG. 6 is a side cross-sectional view of an example of the frame rail and the energy dissipation device after a crash impact according to the present disclosure.

Referring now to FIGS. 5-6, the energy dissipation portion 140 is shown mounted inside a rail 400. The rail 400 is shown to include a rectangular member 406 and one or more bulkheads 410 in addition to the bulkheads 122, 130 and 150 shown above. The rod 114 may extend through a hole in the bulkhead 410 adjacent to the bulkhead 122. The energy dissipation portion 140 is shown located between the bulkheads 150 and 410 forming the non-crushable portion 420 of the rail 400. The rail 400 is shown in FIG. 6 after an impact. The non-crushable portion 420 remains essentially intact. As can be seen, the pins 310 of the energy transfer portion 110 are pushed through the side walls of the energy dissipation portion 140 between the fins.

Figure 7:
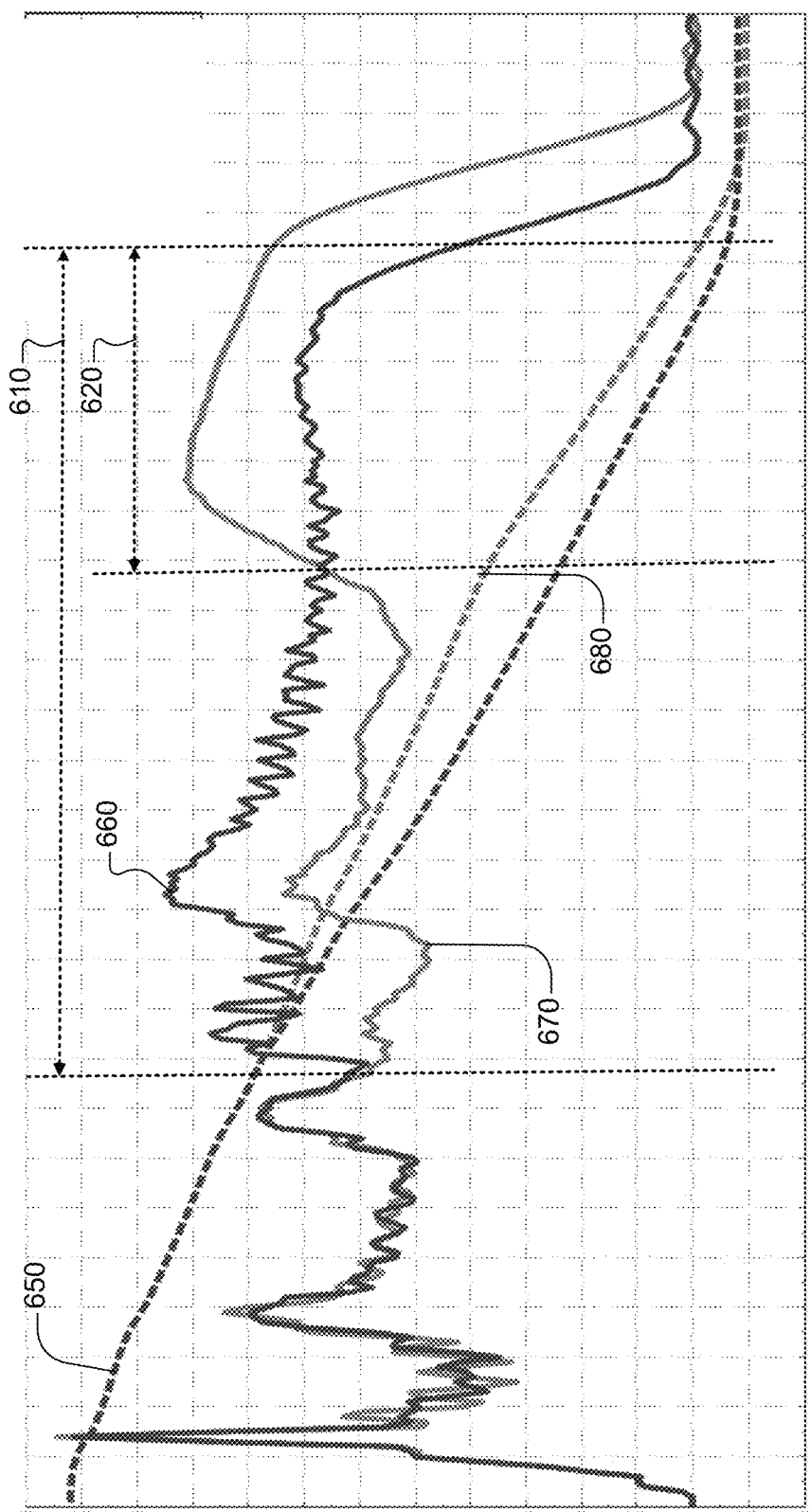
FIG. 7 is a graph of an example of velocity and deceleration as a function of time for a crash impact.
Figure 8:
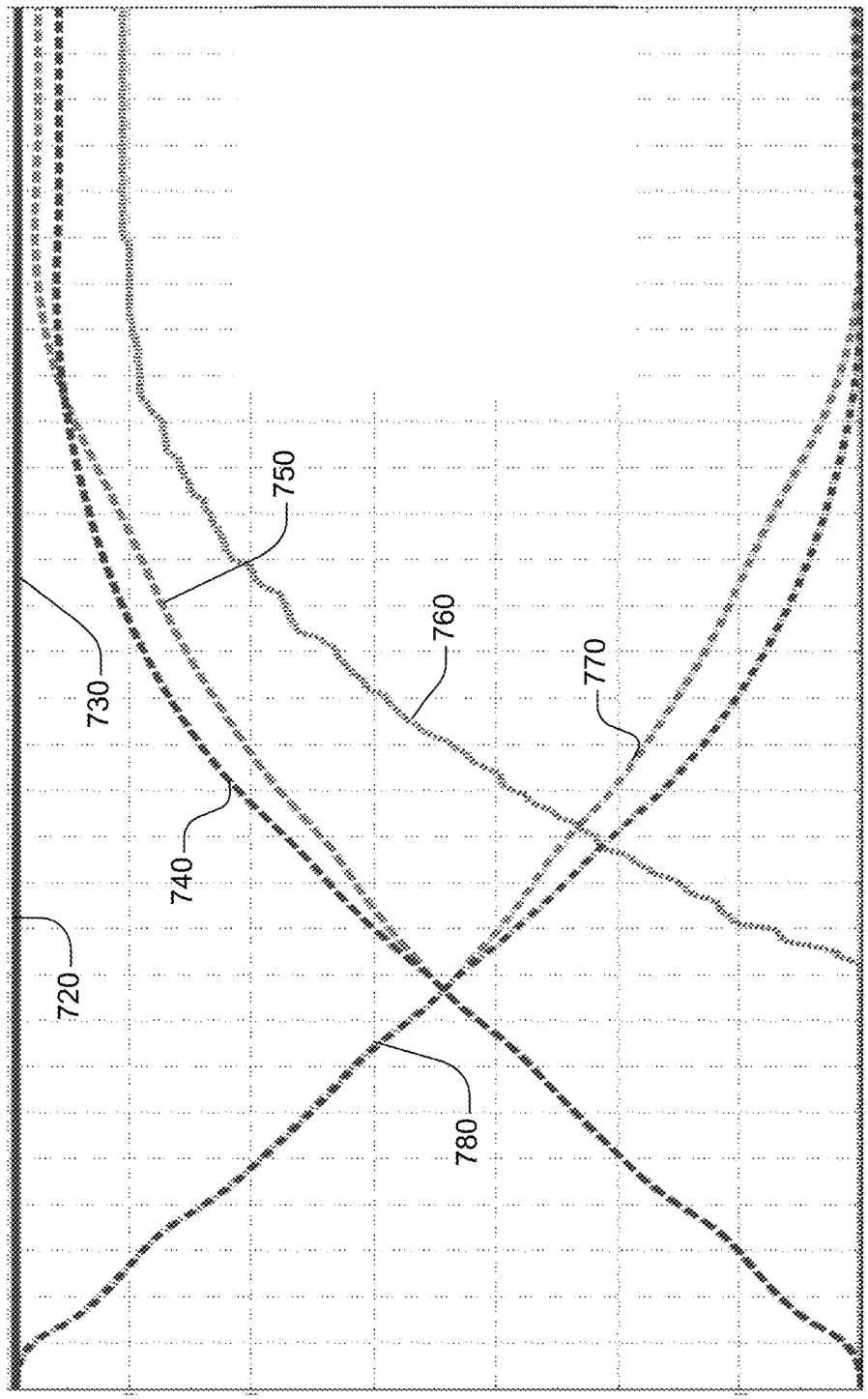
FIG. 8 is a graph of an example of total, kinetic, internal and eroded internal energy as a function of time for the crash impact.
Figure 9:
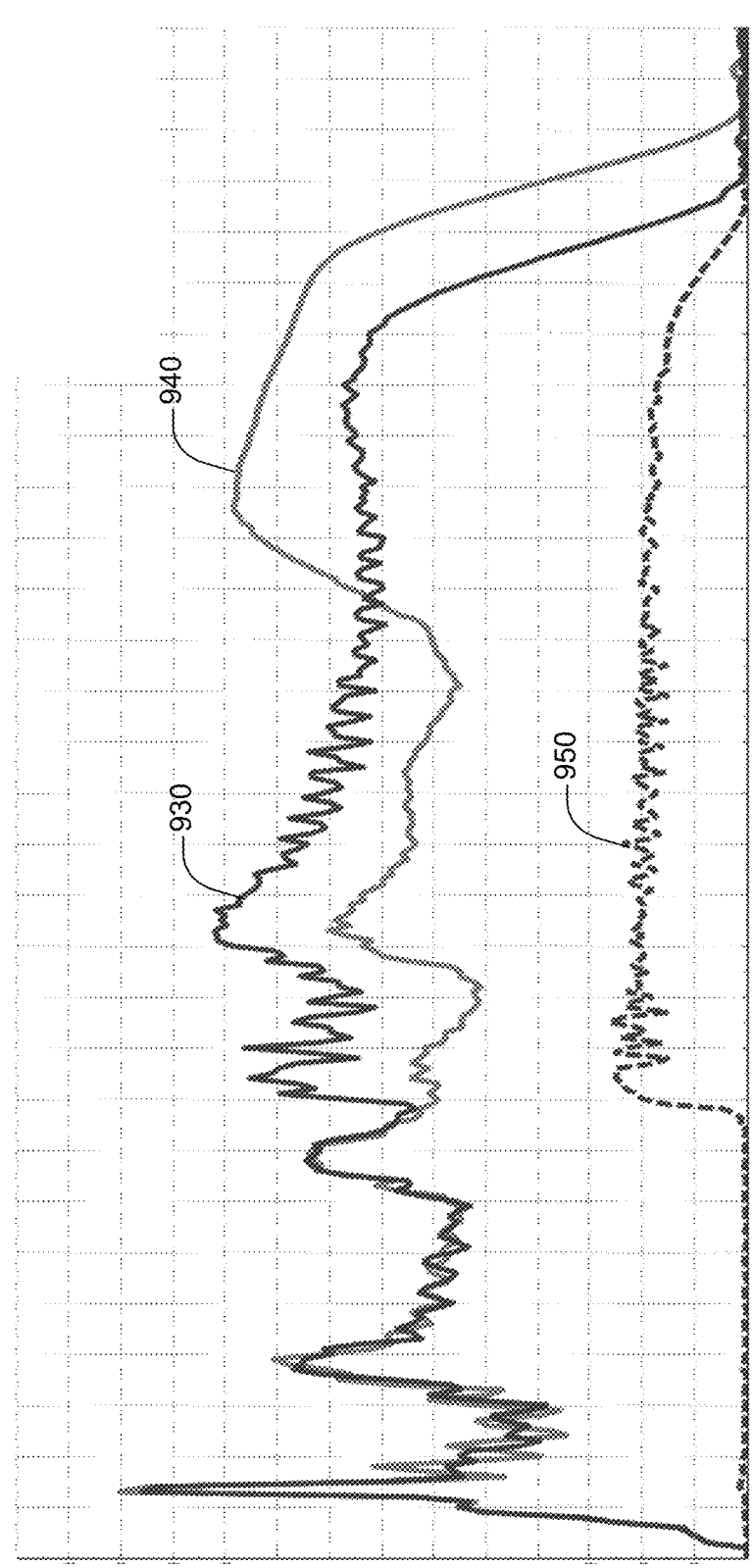
FIG. 9 is a graph of an example of a magnitude of cross-sectional force as a function of time for the crash impact.

Referring now to FIGS. 7-9, various graphs show improved characteristics during an impact. In FIG. 7, velocity is shown as a function of time for baseline velocity 680, baseline acceleration 670, EDD velocity 650 and EDD acceleration 660. A baseline is established by a vehicle including a rail without the energy dissipation device. Earlier engagement of the energy dissipation device provides a more consistent pulse without late peaks (as can be seen during period 610). The baseline data shows a high broad pulse that occurs late during the crash event (as can be seen during period 620). The energy dissipation device has lower acceleration characteristics during the same crash event. The more linear velocity curve of the energy dissipation device and more consistent pulse with reduced peaks late in the crash event (as can be seen during period 620) improves occupant protection.

In FIG. 8, additional energy is absorbed by the energy dissipation device. In FIG. 8, Baseline total energy 720, EDD total energy 730, EDD internal energy 740, baseline internal energy 750, EDD eroded internal energy 760, baseline kinetic energy 770 and EDD kinetic energy 780 are shown. When the energy dissipation device is used and a crash event occurs, eroded energy was absorbed by the energy dissipation device due to fracture. In addition, additional internal energy (max difference between energy dissipation device vs baseline) was absorbed due to deformation.

In FIG. 9, section forces are shown for a baseline frame member and for the frame member including the energy dissipation device. In FIG. 9, EDD rail section force 930, baseline rail section force 940 and EDD plunger section force 950 are shown. The baseline has a high peak in the pulse and increase rail section late in the event is caused by insufficient rail section capacity to appropriately mitigate the decelerating mass behind the rail. The energy dissipation device increases the rail capacity and does so by dissipating the energy using deformation perpendicular to the direction of travel, friction and material fracture that provides consistent resistance. When the energy dissipation device is used, the increased section force reduced force deviation throughout the event.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. An energy dissipation system for a frame of a vehicle, comprising:
   a frame rail including a crushable region and a non-crushable region;
   an energy dissipation device including:
      an energy transfer portion arranged partially in the crushable region and partially in the non-crushable region and configured to move in response to a vehicle impact on the frame rail; and
      an energy dissipation portion arranged within the non-crushable region, connected to the energy transfer portion and including:
         a first region connecting the energy dissipation portion to the non-crushable region; and
         a second region connecting the energy dissipation portion to the energy transfer portion,
         wherein the first region of the energy dissipation portion is stiffer than the second region of the energy dissipation portion.

2. The energy dissipation system of claim 1, wherein the energy transfer portion includes a rod.

3. The energy dissipation system of claim 2, wherein the energy transfer portion further includes a plunger connected to one end of the rod.

4. The energy dissipation system of claim 3, wherein the energy transfer portion further includes N pins extending from the plunger in a direction transverse to a length of the rod, where N is an integer greater than 2.

5. The energy dissipation system of claim 4, wherein the energy dissipation portion includes:
   N cylindrical portions;
   N sidewalls extending between radial edges of the N cylindrical portions; and
   N holes in the N sidewalls to receive the N pins, respectively.

6. The energy dissipation system of claim 5, further comprising a first set of 2N fins extending outwardly from the N sidewalls, respectively, on opposite sides of the N holes.

7. The energy dissipation system of claim 6, further comprising a second set of 2N fins extending inwardly from the N sidewalls, respectively, on opposite sides of the N holes.

8. The energy dissipation system of claim 5, wherein:
   the frame rail includes a first bulkhead, a second bulkhead and a third bulkhead,
   the rod extends through the first bulkhead,
   the rod extends through the second bulkhead.

9. The energy dissipation system of claim 8, wherein the plunger is located between the second bulkhead and the third bulkhead.

10. The energy dissipation system of claim 9, wherein the energy dissipation portion is arranged between the second bulkhead and the third bulkhead.

11. An energy dissipation device including:
    an energy transfer portion configured to be arranged partially in a crushable region of a vehicle frame member and partially in a non-crushable region of the vehicle frame member and to move in response to a vehicle impact; and
    an energy dissipation portion configured to be arranged within the non-crushable region, connected to the energy transfer portion and including:
       a first region configured to connect the energy dissipation portion to the non-crushable region; and
       a second region connecting the energy dissipation portion to the energy transfer portion,
       wherein the first region of the energy dissipation portion is stiffer than the second region of the energy dissipation portion.

12. The energy dissipation device of claim 11, wherein the energy transfer portion includes:
    a rod;
    a plunger connected to one end of the rod; and
    N pins extending from the plunger, where N is an integer greater than 2.

13. The energy dissipation device of claim 12, wherein the energy dissipation portion includes:
    N cylindrical portions;
    N sidewalls extending between radial edges of the N cylindrical portions; and
    N holes in the N sidewalls to receive the N pins, respectively.

14. The energy dissipation device of claim 13, further comprising a first set of 2N fins extending outwardly from the N sidewalls, respectively, on opposite sides of the N holes.

15. The energy dissipation device of claim 14, further comprising a second set of 2N fins extending inwardly from the N sidewalls, respectively, on adjacent sides of the N holes.

16. An energy dissipation device including:
    an energy transfer portion configured for arrangement partially in a crushable region of a vehicle frame member and partially in a non-crushable region of the vehicle frame member and including:
       a rod;
       a plunger connected to one end of the rod;
       a mount configured to attach the rod to the crushable region of the vehicle frame member; and
       N pins extending from the plunger in a direction transverse to the rod, where N is an integer greater than 2; and
    an energy dissipation portion configured to be arranged within the non-crushable region, connected to the energy transfer portion and including:
       N cylindrical portions;
       N sidewalls extending between radial edges of the N cylindrical portions; and
       N holes in the N sidewalls to receive the N pins, respectively, of the energy transfer portion.

17. The energy dissipation device of claim 16, further comprising:
    a first set of 2N fins extending outwardly from the N sidewalls, respectively, on adjacent sides of the N holes; and
    a second set of 2N fins extending inwardly from the N sidewalls, respectively, on adjacent sides of the N holes.

* * * * *